June 9, 1936.  L. EDELMANN  2,043,405
THERMO-HYDROMETER
Filed July 30, 1932   2 Sheets-Sheet 2
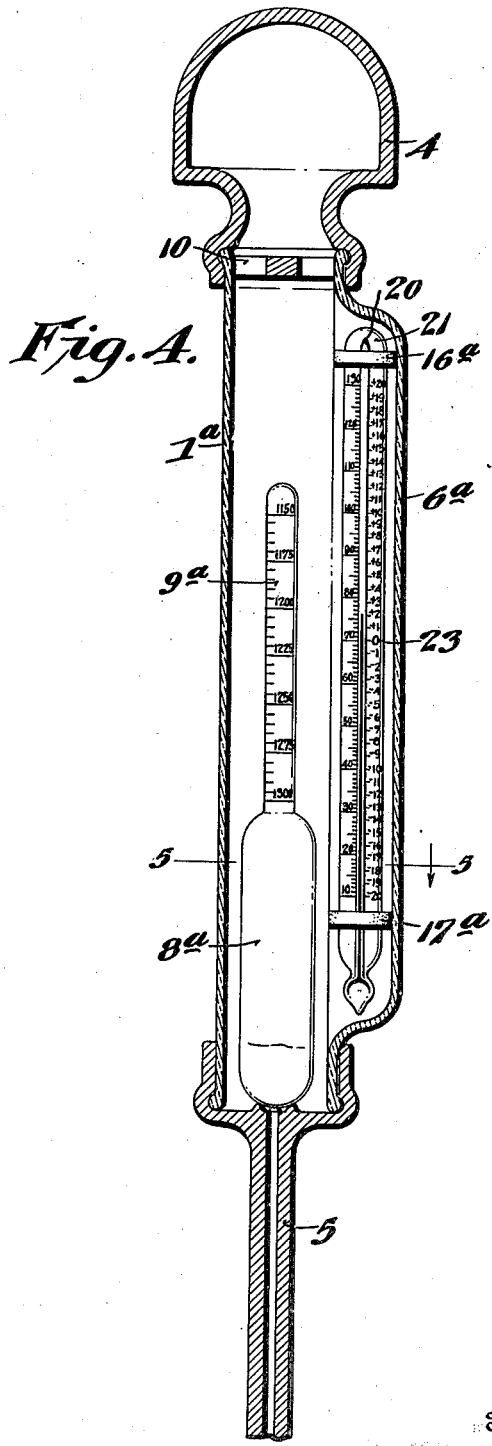
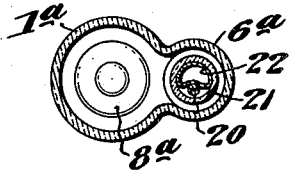
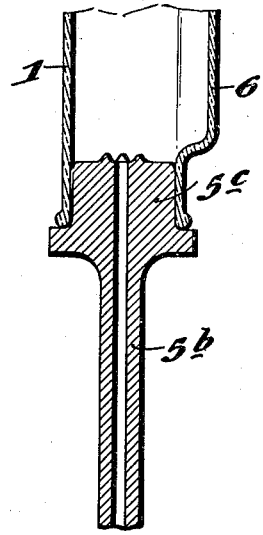
Inventor
Leo Edelmann
By Lloyd W. Patch
Attorney Patented June 9, 1936

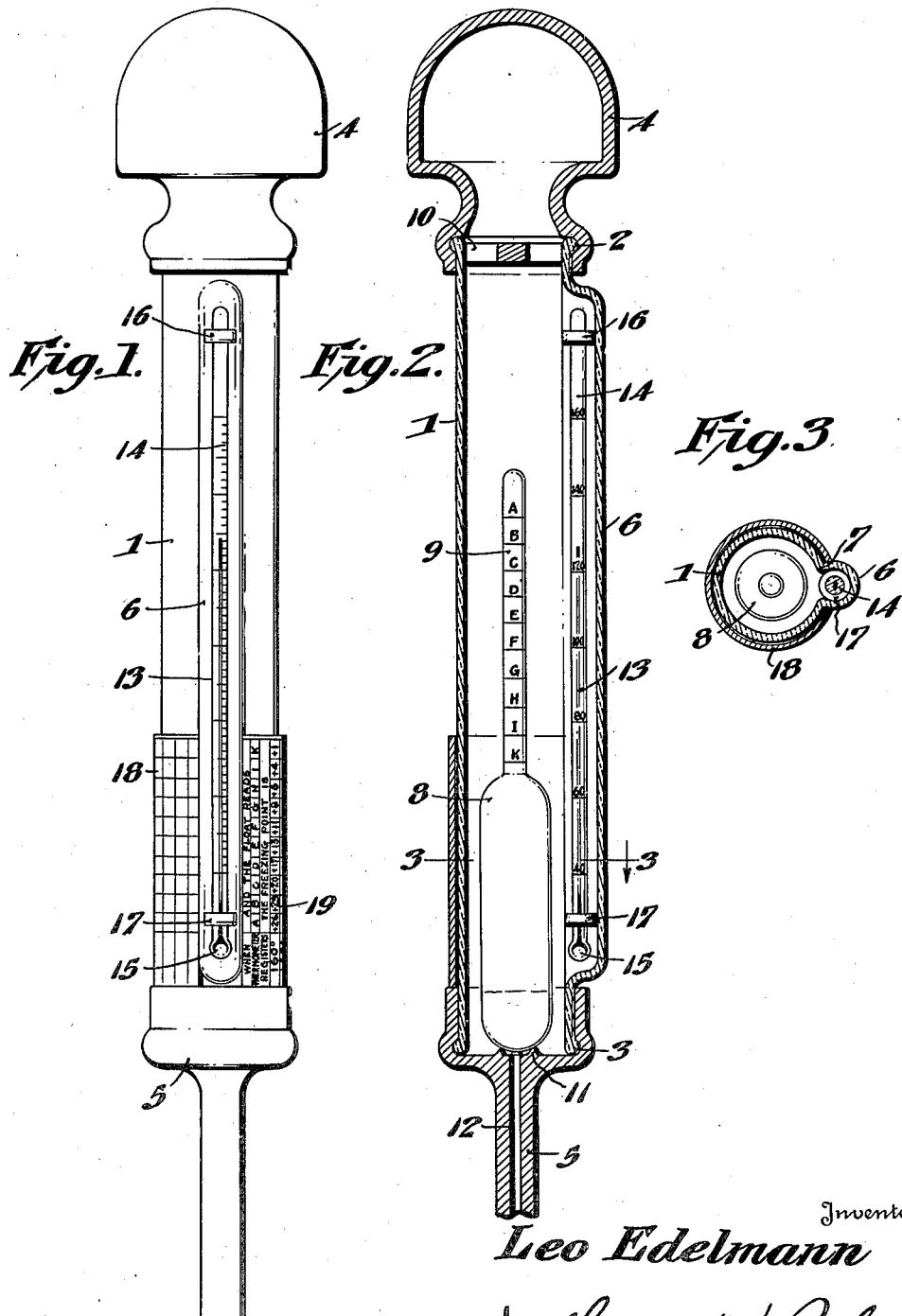

2,043,405

UNITED STATES PATENT OFFICE 2,043,405

THERMO-HYDROMETER

Leo Edelmann, Chicago, Ill., assignor to E. Edelmann & Co., Chicago, Ill., a corporation of Illinois Application July 30, 1932, Serial No. 627,000

2 Claims. (Cl. 265—46)

My invention relates to improvements in thermo-hydrometers and particularly to a device of this character intended for use in testing and measuring the strength of battery acids, radiator solutions, and other liquid solutions, ordinarily subject to variations in density due to temperature changes.

An object is to provide a thermo-hydrometer of simple and compact form, which is of few parts readily manufactured and assembled, and which presents the various gauge and scale portions in a manner to be freely and clearly observed and noted in taking readings.

Another object is to so construct and mount the parts that the temperature responsive and indicating portion is positioned closely adjacent to and adapted to be directly immersed in and influenced by the same test quantity of liquid as the gauge float.

Still another object is to provide an instrument in which all of the parts are substantially contained and carried by a single barrel or housing to thus reduce the number of parts and the manufacturing operations to a minimum.

Yet another object is to so construct and mount the parts that the temperature responsive device, the gauge float and the correction scale can be readily replaced or changed to thus permit the main portions to be assembled or interchangeably fitted with indicating and scale parts for use with different solutions and under various conditions to suit the particular requirements of each individual adaptation.

A still further object is to provide a device of this character in which the thermometer or other temperature responsive device and the gauge float are contained in a single barrel or housing, and the temperature responsive device is at all times held and maintained in a position where it will not interfere with or hinder the full and free movement of the gauge float.

With the above and other objects in view, which will be apparent to those skilled in this art, my invention includes certain novel features of construction and combinations of parts which will be hereinafter set forth in connection with the drawings and then pointed out in the claims.

In the drawings:

Fig. 1 is a view in elevation illustrating a thermo-hydrometer constructed in accordance with my invention;

Fig. 2 is a vertical sectional view taken in a plane at right angles to the showing in Fig. 1;

Fig. 3 is a horizontal transverse sectional view substantially on line 3—3 of Fig. 2;

Fig. 4 is a view similar to Fig. 2 illustrating a modified construction;

Fig. 5 is a horizontal transverse sectional view substantially on line 5—5 of Fig. 4; and Fig. 6 is a fragmentary longitudinal sectional view of the lower portion of a hydrometer illustrating another modified construction.

As the parts are shown in Figs. 1, 2, and 3, the liquid and float housing or barrel 1 is of substantially cylindrical form in its general lines, and this barrel or housing is made of glass or other suitable transparent material. The barrel or housing 1 preferably has bead formations 2 and 3 at its ends on which are fitted the usual suction and expulsion bulb 4 and the usual nozzle member 5. To all intents and purposes the barrel 1, the bulb 4 and the nozzle member 5 can be of substantially standard form and construction, and may be of any desired type as now ordinarily used in hydrometer and thermo-hydrometer structures.

At one side the barrel or housing 1 has an offset 6 blown, molded, or otherwise formed to extend for a considerable distance longitudinally throughout the middle portion and to yet leave the ends adjacent the beads 2 and 3 of substantially usual form for reception of the bulb 4 and nozzle member 5. As better illustrated in Fig. 3, this offset 6 is preferably so shaped that the chamber formed thereby is open entirely along the side adjacent the main chamber or opening of the barrel or housing 1, and the meeting edges of the two portions are preferably slightly drawn in, as indicated at 7, so that this opening is of slightly less width than the maximum width of the chamber in the offset portion 6.

The usual gauge float 8 is received in the main chamber of the barrel or housing 1 and the gauge stem 9 of this float is appropriately marked by etching thereon, by enclosing a scale carrying sheet, or in any other desired manner. A perforated washer or member 10 is preferably provided in the end of the housing or barrel 1 to keep the gauge float from entry into the bulb 4, and it is perhaps preferable that beads 11, or other appropriate formations, be provided around the inner end of the nozzle passage or opening 12 to hold the gauge float 8 from closing this passage.

A temperature responsive and indicating member 13, which in the present instance is shown as being a thermometer having a relatively long and straight capillary tube 14 with a liquid bulb 15 at one end, is adapted to be mounted in the chamber of the offset 6 with the bulb end 15 lowermost, and collars or rings 16 and 17 of rubber or other suitable resilient cushion material that will not be affected by the liquid being tested are fitted around the tube 14 adjacent to the ends thereof. These collars or sleeves 16 and 17 are made of such external diameter that they will fit snugly within the chamber formed by the offset 6, and in assembling the thermometer with the barrel or housing the collars or sleeves 16 and 17 will be sufficiently compressed to pass through the restricted portion at 7, and in consequence these collars or sleeves 16 and 17 will positively hold the thermometer tube in the proper position within the chamber of the offset portion 6, and will retain the same against accidental or casual movement into the main chamber of the housing 1 where it would interfere with full and free movement of the gauge float.

In the present instance I have shown the capillary tube 14 of the thermometer 13 as graduated and marked off by etching, or any other suitable manner, and the scale markings are in degrees of Fahrenheit. This instrument is well adapted for testing radiator solutions to determine the freezing point of the solution, and the gauge stem 9 of the gauge float 8 has the indicating markings thereon shown as letters of the alphabet, these characters being taken as readily distinguishable and not apt to be confused with temperature indicating readings of the thermometer.

With a thermo-hydrometer of this character, having the temperature and gauge float markings shown in the manner described, corrections for variations in the density of the liquid being tested, due to temperature variations, are accomplished by noting the reading of the thermometer and the reading of the gauge float, and then taking the correction by cross-reading upon a correction scale; and, it is desirable and advisable that the correction scale be assembled as a part of the instrument to be readily visible and freely read within substantially the same field of vision as the thermometer and the float element. With this in mind, I provide a correction scale carrying member 18, substantially in the form of a split sleeve, to be mounted around the lower end of the main portion of the barrel or housing 1, with the offset portion 6 received within the split opening to thus leave the entire length of the capillary tube of the thermometer 13 open for reading. This member 18 mounted in the manner set forth does not obstruct the full view of the thermometer, and will not interfere with free and full reading of the indications on the float gauge, by reason of the fact that when the gauge is in use it is floating within the barrel 1 with the full length of its stem 9 entirely above the upper edge of the sleeve member 18.

Correction scale markings, as indicated at 19, can be printed or otherwise placed upon the member 18 to be in full view and in substantially the same field of vision as the markings of the thermometer and the markings on the gauge stem 9, and as here illustrated the temperature markings are carried in one column of the correction scale and the markings of the gauge float stem are arranged substantially at right angles, figures being entered at crossing points with respect to the two columns to show temperatures at which a radiator solution will freeze or solidify sufficiently to cause probable damage to the system. This thermo-hydrometer can be used for other purposes and for testing other solutions, and for each particular adaptation the markings on the stem 9 and the markings on the correction scale member 18 will be varied to suit the particular requirements.

In Figs. 4 and 5 I have illustrated a modified construction in which the barrel or housing 1ª has a relatively larger offset 6ª. A thermometer 20, of the capillary tube type, is assembled with the capillary tube enclosed in a tubular housing 21, of glass or other suitable transparent material, and a scale member 22, of paper or other suitable sheet material, is placed within this tube 21 back of the capillary tube 20 so that the scale markings and readings on the scale member 22 can be readily viewed and freely read in conjunction with the indicating column within the capillary tube. Collars or sleeves 16ª and 17ª are provided around the housing tube 21 adjacent the ends thereof and fit snugly within the opening of the offset portion 6ª to retain the tube 21, and consequently the thermometer, in proper position within the offset, and against displacement therefrom.

The instrument here shown is perhaps particularly adapted for testing and determining the strength of battery solutions and the like, and the gauge stem 9ª of the gauge float 8ª is marked off in the usual manner with figures now ordinarily recognized as standard for testing battery solutions. The scale member 22 of the thermometer may have markings thereon indicating the degrees in temperature, either Fahrenheit or centigrade, and a correction scale may be employed; however, I have found it advantageous to mark upon the scale member 22 degrees or points to be added to or subtracted from the readings taken on the scale of the gauge stem 9ª. The ideal or neutral point 23 on this correction scale as marked on the scale member 22 is here indicated as being substantially at 70° F., and above this zero point figures are indicated to be added to the reading as taken on the scale of the gauge stem 9ª, while below the zero point figures are shown to be subtracted from the reading on the gauge stem. With this arrangement and marking of the scales it is not necessary to make cross-readings upon a separate correction scale, and the final figure or determination is very readily arrived at without any complicated readings or computations.

In Fig. 6 I have illustrated the barrel 1 as provided with the offset 6, substantially the same as shown in Figs. 1, 2, and 3, and in this instance the nozzle member 5ᵇ is provided with a plug portion 5ᶜ to be inserted into the end of the barrel or housing 1. Other variations of this nature might be made to suit different and particular requirements of use and to adapt my invention to any of the well known types and forms of hydrometer, and thermo-hydrometer, constructions.

While I have here shown and described only certain specific embodiments of my invention and have illustrated and suggested only certain possible modifications, it will be appreciated that other changes and variations can be made in the form, construction, arrangement and assembly of the parts, and in the showing and arrangement of correction scales and other features, without departing from the spirit and scope of my invention.

I claim:

1. A thermo-hydrometer comprising, a tubular glass liquid barrel of substantially cylindrical form in the main, said barrel having an elongated offset recess portion lying longitudinally on one side intermediate the ends of the barrel, said offset recess being open on one side into the main portion of the barrel along one side and being formed in cross section to be narrowed along the open side to thus form retaining shoulders, a nozzle at one end of the barrel, a bulb at the other end of the barrel, a gauge float in the barrel, a thermometer in the offset recess to be thus exposed substantially throughout its length to be influenced by liquid in the barrel, and soft rubber cushion rings between the thermometer and the side walls of the recess and frictionally engaging them to hold the thermometer in place against longitudinal and lateral shifting and displacement, the shoulder portions at the open side of the recess serving to retain the thermometer in place and to restrict the opening to keep the gauge float from contact with the thermometer tube.

2. A thermo-hydrometer comprising, a tubular transparent liquid-containing barrel of substantially cylindrical form in the main, said barrel having an elongated offset recess portion extending longitudinally on one side intermediate the ends of the barrel and said offset recess being open entirely along its side into the main portion of the barrel and formed along this open side with restricting portions, nozzle and suction means mounted respectively at the ends of the barrel, a gauge float in the main portion of the barrel, a thermometer in the offset recess to thus be exposed substantially throughout its length to be influenced by the quantity of liquid taken into the barrel to influence the gauge float, and compressible cushion rings fitted between the thermometer and the side walls of the recess and frictionally engaging the restricted portions at the sides of the recess to hold the thermometer in place against longitudinal and lateral shifting and displacement.

LEO EDELMANN.